United States Patent [19]

Owen, Jr.

[11] 4,297,007
[45] Oct. 27, 1981

[54] OPTICAL APPARATUS AND METHOD FOR CHANGING A ZOOM CAMERA TO A FIXED FOCUS CAMERA

[75] Inventor: R. Calvin Owen, Jr., Belmont, Mass.

[73] Assignee: Polaroid Corporation, Cambridge, Mass.

[21] Appl. No.: 32,969

[22] Filed: Apr. 24, 1979

[51] Int. Cl.³ .......................... G02B 3/04; G02B 9/60; G02B 15/14

[52] U.S. Cl. .................... 350/432; 350/429; 350/465

[58] Field of Search .............. 350/184, 187, 189, 429, 350/432, 465

[56] References Cited

U.S. PATENT DOCUMENTS

| | | | |
|---|---|---|---|
| Re. 29,237 | 5/1977 | Muszumanski et al. | 350/184 |
| 660,747 | 10/1900 | Bausch | 350/220 |
| 2,343,629 | 3/1944 | Altman | 350/221 |
| 2,377,268 | 5/1945 | Rinia | 350/189 |
| 2,468,564 | 4/1949 | Luneburg | 350/189 |
| 2,502,543 | 4/1950 | Warmisham | 350/189 |
| 2,552,672 | 5/1951 | Grey | 350/189 |
| 2,803,996 | 8/1957 | Bouwers | 350/200 |
| 3,011,401 | 12/1961 | Sandback | 350/208 |
| 3,011,402 | 12/1961 | Johnson | 350/206 |
| 3,014,406 | 12/1961 | Back | 350/184 |
| 3,074,316 | 1/1963 | Cox et al. | 350/208 |
| 3,191,496 | 6/1965 | Cook | 350/187 |
| 3,306,695 | 2/1967 | Baker | 350/189 |
| 3,348,896 | 10/1967 | Betensky | 350/2 |
| 3,604,786 | 9/1971 | Baker | 350/212 |
| 3,890,036 | 6/1975 | Grey | 350/184 |
| 3,920,315 | 11/1975 | Linke | 350/189 X |
| 3,926,504 | 12/1975 | Fleischman | 350/189 |
| 3,972,592 | 8/1976 | Ruben | 350/189 X |
| 4,035,063 | 7/1977 | Ikeda | 350/189 |
| 4,105,308 | 8/1978 | Owen, Jr. et al. | 350/189 |
| 4,153,339 | 5/1979 | Tajima et al. | 350/189 X |
| 4,159,865 | 7/1979 | Kawamura et al. | 350/189 X |
| 4,196,968 | 4/1980 | Itoh | 350/184 |

*Primary Examiner*—John K. Corbin
*Assistant Examiner*—Scott J. Sugarman
*Attorney, Agent, or Firm*—Francis J. Caufield

[57] ABSTRACT

A method and optical apparatus by which a camera initially adapted to utilize a zooming optical system of the type which includes a variable focus, afocal zoom lens section and a prime lens section is adapted to utilize only the prime lens section of the zooming optical system.

8 Claims, 12 Drawing Figures

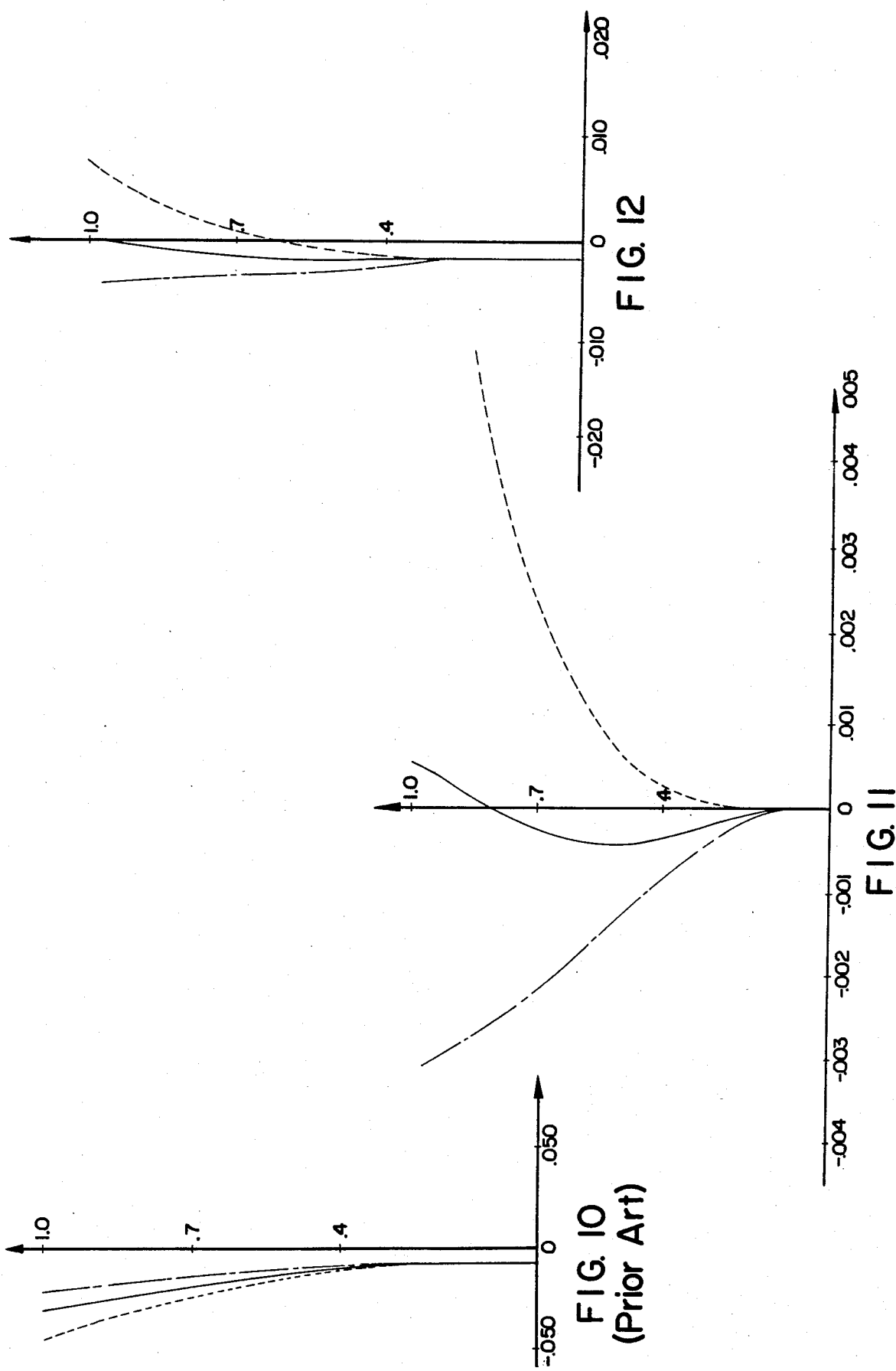

OPTICAL APPARATUS AND METHOD FOR CHANGING A ZOOM CAMERA TO A FIXED FOCUS CAMERA

BACKGROUND OF THE INVENTION

1. Field of the Invention

This invention in general relates to photographic optical systems but in particular to a method and optical apparatus by which a camera initially adapted to utilize a two part zooming optical system can be adapted to utilize only one part of the two part zooming optical system.

2. Description of the Prior Art

Zooming optical systems for use in motion picture cameras are well-known in the photographic arts and usually consist of two separate lens sections, a variable power afocal section whose focal length can be continuously adjusted by movement of one or more groups of its elements and a fixed focus prime lens section which accepts rays emerging from the variable power afocal section to form the final image on the film.

By varying the focal length of the afocal section, a corresponding change in the magnification of the image "seen" by the prime lens is effected while the rays emerging from the variable power section are kept collimated or nearly so with changing magnification.

The basis upon which the focal length of the variable power afocal section can be adjusted resides in the fact that in a lens system which consists of positive and negative lens elements a change in the separation of the elements changes its focal length. This, however, also alters the lens to image distance for maximum image sharpness. Since photographic cameras usually have fixed film planes and it is essential that image sharpness not be changed with changing focal length, such variable focus afocal sections are further structured in such a way that movement of one or more groups of its lens elements is effected so that image sharpness at the film plane is maintained more or less constant with changing focal length or magnification. This is accomplished by what is known as compensation which is achieved in essentially two known ways, mechanically or optically.

In mechanically compensated variable focus sections, movement of the lens element which changes focal length may be linked with the movement of another lens element which compensates for a change in back focus and so keeps the image sharp. These two movements are unequal and are therefore linked by a cam system.

In the optically compensated system, two or more lens components may be fixedly connected together in such a way that they both move the same distance yet keep the image sharp at different focal lengths. Thus, the optically compensated system involves no variable separation between its moving elements.

For a more detailed description of such zooming optical systems, reference may be made to U.S. Pat. No. 3,014,406 issued to Frank G. Back on Dec. 26, 1961 and entitled "Varifocal Lens Assembly For Still Camera Photography"; U.S. Pat. No. 3,890,036 issued to David S. Grey on June 17, 1975 and entitled "Zoom Lens System"; and U.S. Pat. No. Re 29,237 reissued to Trude Muszumanski et al. on May 31, 1977 and entitled "Zoom Lens For Super 8 Film".

In terms of lens performance, zooming optical systems inevitably represents a compromise of greater tolerance than is accepted for a high class lens of fixed focal length. This is because the various lens aberrations, normally corrected for specific inter-element separations, have to be kept constantly low over the whole movement range of the movable elements in the zooming optical system. The compromise generally is achieved by using the aberration characteristics of one or more fixed elements to cancel those of the moving elements. In some zooming optical systems, however, the characteristics of the fixed focus prime lens section elements are designed in such a way that the peformance of the prime lens section by itself is allowed to intentionally degrade in certain respects to cancel aberrations in the variable focus afocal lens section.

Consequently, in zooming optical systems where the aberrations of one section are used to correct those of the other, neither the variable power afocal section nor the fixed focus prime lens section can be used independently for another purpose because neither section when used by itself is favorably corrected for aberrations.

It is therefore a primary object of the present invention to provide a method and optical apparatus by which a camera initially adapted to utilize a zooming optical system of the type which includes two separate sections, a variable focus afocal lens section and a fixed focus prime lens section neither of which by itself is favorably corrected for aberrations, can easily be adapted to utilize only the prime lens section.

Other objects of the invention in part will be obvious and in part will appear hereinafter. The invention accordingly comprises the method and apparatus possessing the construction, combination of elements, arrangement of parts, and steps which are exemplified in the following detailed description.

SUMMARY OF THE INVENTION

This invention in general relates to photographic optical systems but in particular to a method and optical apparatus by which a camera initially adapted to utilize a two section zooming optical system can easily be adapted to use only one section of the zooming optical system.

The camera zooming optical system is of the type which includes a multi-element, variable focus afocal section that is structured to provide a continuously variable magnification over a predetermined range and a four element, air spaced prime section that is structured to receive collimated to nearly collimated rays emerging from the afocal section and form the final image on the film plane. Neither of the camera zooming optical system sections, by itself, is favorably corrected for aberrations but are favorably corrected when used in combination.

The optical apparatus of the invention comprises an apertured adapter plate which is structured to fit into the part of the camera structured to receive the variable focus afocal lens section in such a way that the aperture in the adapter plate is spaced ahead of the prime lens section by a predetermined distance while the center of the aperture is aligned in a predetermined manner with the optical axis of the prime lens section.

Further included are optical means, having at least one aspheric surface, that are optically structured to simulate the aberration correction characteristics of the variable focus afocal lens section so that the optical means in combination with the prime lens section cooperate to form on the film a final image of the scene which is favorably corrected for aberrations at a fixed focus.

The aspherized optical means is mounted in registration with the aperture of the adapter plate either before or after the adapter plate is mounted in the camera. The distance from the prime lens section to the film plane is also preferably changed so that the prime lens section is focused at a fixed finite distance.

Two specific examples for the aspherized optical means are given for a specific prime lens section design.

DESCRIPTION OF THE DRAWINGS

The novel features that are considered characteristic of the invention are set forth with particularity in the appended claims. The invention itself, however, both as to its organization and method of operation together with other objects and advantages thereof will best be understood from the following description of the illustrated embodiment and method when read in connection with the accompanying drawings wherein like numbers have been employed in the different figures to denote the same parts and wherein:

FIGS. 4–12 are comparison graphs illustrating the lens performance of a prime lens section of the zooming optical system shown in FIGS. 2 and 3 without and with embodiments of the invention wherein the comparison graphs, which are normalized to 1.0 at full half field angle, are for RMS blur, distortion, and field sags.

DESCRIPTION OF THE PREFERRED EMBODIMENT

Figure 1:
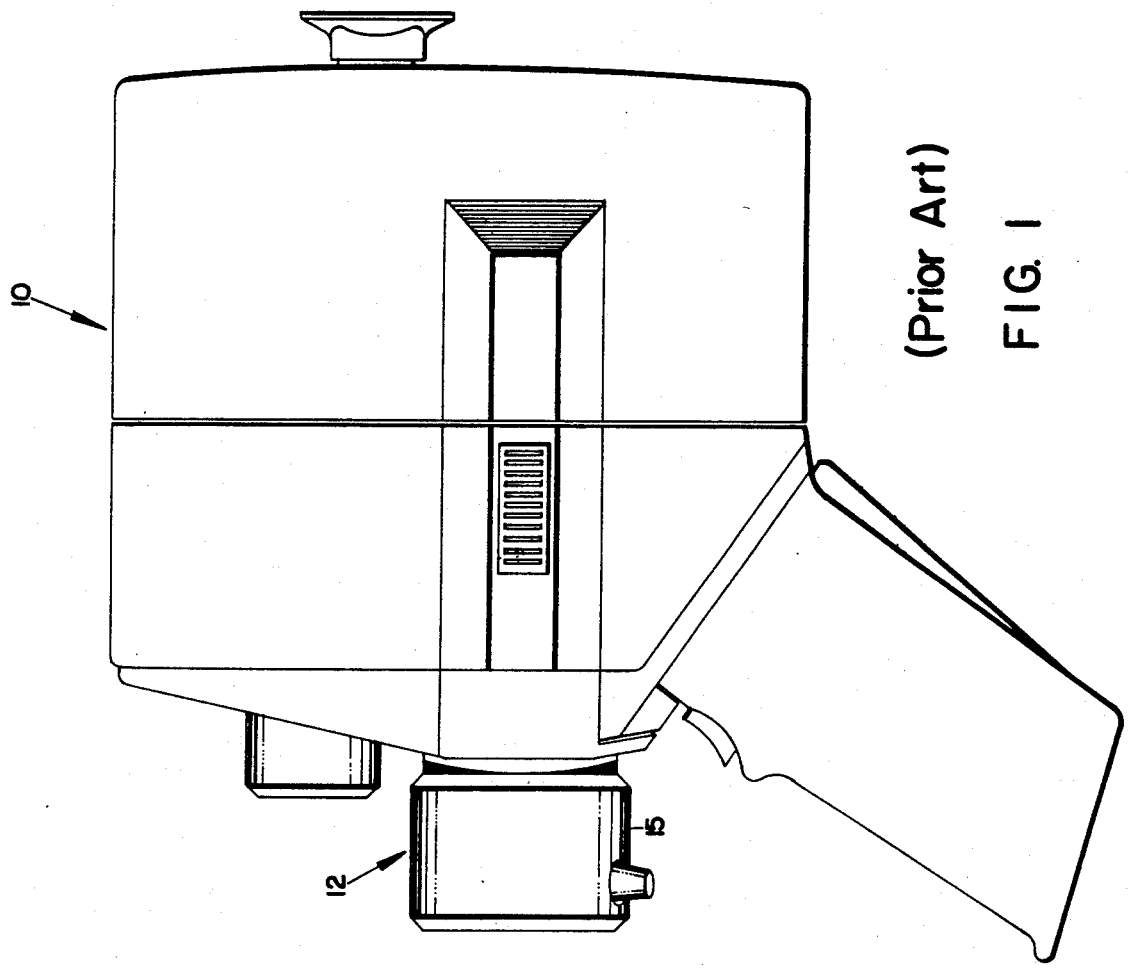
FIG. 1 is a side elevational view of a motion picture camera representative of the prior art.
Figure 2:
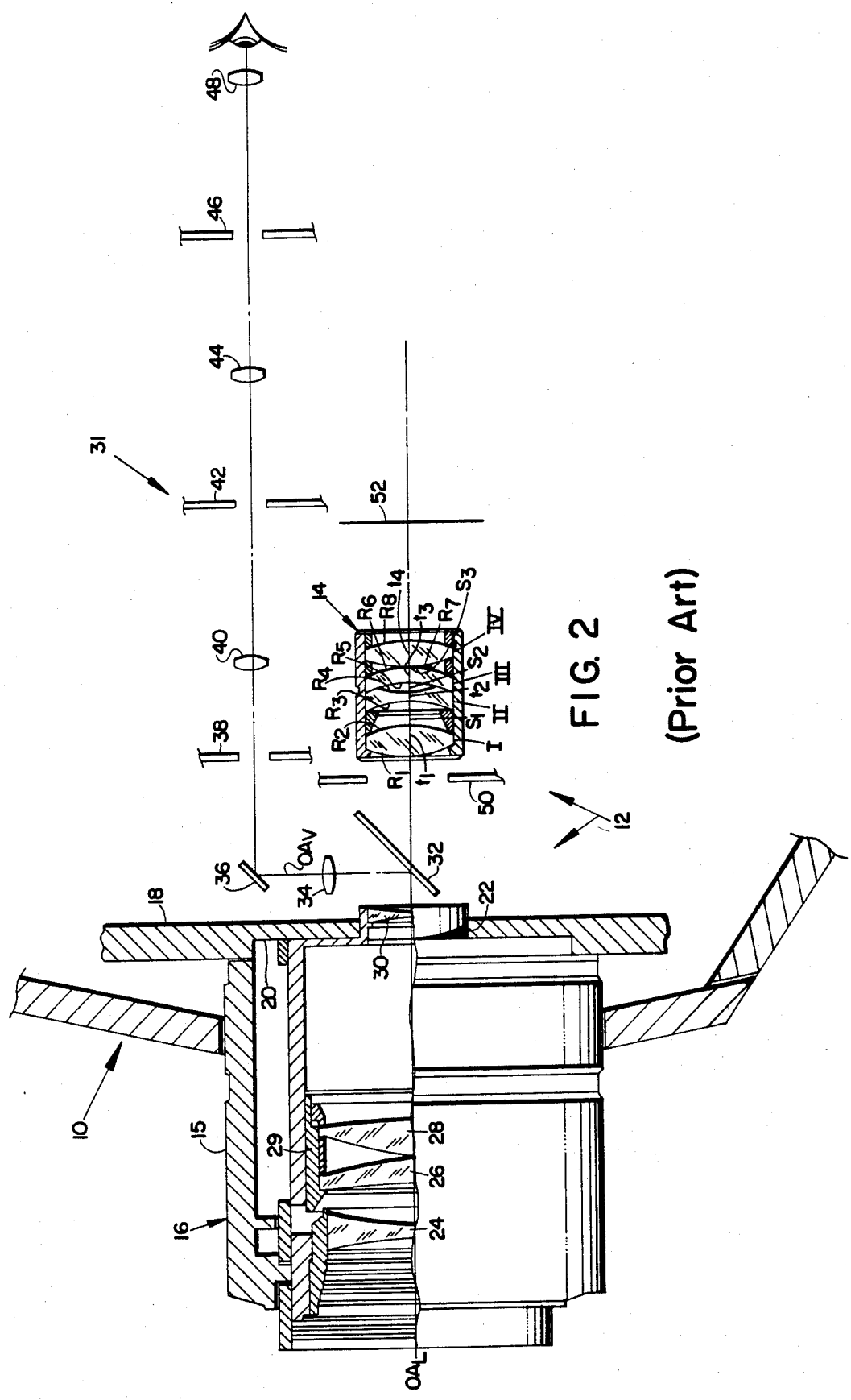
FIG. 2 is an enlarged sectional view of a part of the optical system of the camera of FIG. 1 taken along a vertical plane passing through the center of the camera in the plane of FIG. 1.

Referring now to FIGS. 1 and 2, there is shown a motion picture camera 10 which includes a well-known zooming optical system which is generally designated at 12. Both the camera 10 and the zooming optical system 12 are representative of the prior art and are included here to illustrate certain features of each with which the present invention cooperates in a manner to be more fully described.

The motion picture camera 10 may be any of a number of well-known types but, as illustrated, represents Polaroid Corporation's Polavision camera which is adapted in a well-known manner to accept instant color motion picture film which can be processed and viewed via a player (not shown) immediately after it has been exposed. The zooming optical system 12 of the camera 10 is a two section lens system comprising a well-known four element, air spaced, prime lens section 14 and a well-known multi-element, variable focus, afocal zooming lens section 16. The f-number of the zooming optical system 12 is 1.8 and its zoom ratio is 2:1. Also provided, but not shown, is a two position adjustment arrangement for allowing selection between near and far focus ranges, the near focus being set between 6 and 15 feet and the far focus between 15 feet and infinity. The zoom section 16 of the zooming optical system 12 is adjusted in a well-known manner by rotation of a lens barrel shown at 15.

As best shown in FIG. 2, the zoom lens section 16 comprises a fixed negative field lens 24 which is followed by a pair of positive lens elements 26 and 28 which are movable in a common frame 29. The positive lens elements, 26 and 28, are followed by a further movable element, a negative lens element 30. Movement of the various movable elements of the zooming lens section 16 is effected via a well-known mechanical camming arrangement (not shown) that operates to maintain the proper spatial relationships between the optical elements of the zooming lens section 16 such that its focal length is changed in accordance with the spacing between its various elements.

By varying the focal length of the afocal zooming section 16, a corresponding change in the magnification of the image "seen" by the prime lens section 14 is effected while the rays emerging from the variable power zooming lens section 16 are kept collimated or nearly so with changing magnification. For a more detailed description of zooming optical systems such as that shown at 16, reference may be had to the previously mentioned U.S. Pat. Nos. 3,014,406; 3,890,036; and Re 29,237.

The zooming lens section 16 is mounted to a camera wall 18 which includes a recess 20 that is specially configured to receive the rear end of the zooming lens section 16. Included in the center of the recess 20 is an aperture 22 that is configured to allow the negative movable lens 30 of the zooming lens section 16 to move axially along the optical axis, $OA_L$, of the zooming optical system 12.

The prime lens section 14 is a well-known fixed focus type having four air spaced elements which have the characteristics set forth in the table below which refers to FIG. 2.

| Lens | $n_d$ | V | Radii (in.) | Thickness (in.) |
|---|---|---|---|---|
| I | 1.6911 | 54.8 | $R_1 = .614$ | $t_1 = .126$ |
|   |   |   | $R_2 = -1.245$ | $s_1 = .133$ |
| II | 1.7508 | 27.8 | $R_3 = -.450$ | $t_2 = .040$ |
|   |   |   | $R_4 = .48$ | $s_2 = .023$ |
| III | 1.6111 | 58.8 | $R_5 = -2.0187$ | $t_3 = .100$ |
|   |   |   | $R_6 = -0.5755$ | $s_3 = .005$ |
| IV | 1.6111 | 58.8 | $R_7 = 0.599$ | $t_4 = .128$ |
|   |   |   | $R_8 = -0.5564$ |   |

In the above table the Roman numerals refer to the lens elements shown in FIG. 2 from front to rear; $n_d$ is the refractive index; V is the Abbe number; $R_1, R_2 \ldots$ represent radii of successive refractive surfaces from front to rear; and t and s represent thickness of lens elements and air spaces, respectively. The prime lens section 14 is configured in the foregoing manner to accept rays which emerge from the variable power afocal zoom section 16, i.e., from the element 30, and form the final image on the film which is located at a film plane generally designated at 52.

The prime lens section 14 is of a type which is representative of those shown in, for example, U.S. Pat. No. 3,001,402 issued to Walter J. Johnson on Dec. 5, 1961 and entitled "Optical Objective"; U.S. Pat. No. 3,001,401 issued to Irving C. Sandback on Dec. 5, 1961 and entitled "Optical Objective"; and U.S. Pat. No. 3,074,316 issued to Arthur Cox et al. on Jan. 22, 1963 and entitled "Highly Corrected Optical Objective".

The particular configuration for the prime lens section 16, as set forth in the table hereinabove, is such as to make its optical performance for the correction of aberrations unfavorable when used independently of the zooming lens section 16. Likewise the zooming lens section 16 by itself is also unfavorably corrected for aberrations. However, the aberrations of both the lens sections 14 and 16 when used in conjunction with one another cancel to provide a favorably corrected image at the film plane 52. Consequently, neither the variable power afocal section 16 nor the fixed focus prime section 14 of the zooming optical system 12 can be independently used for another purpose because neither section when used by itself is favorably corrected for aberrations.

To complete the description of the optical system of the camera 10, reference is again made to FIG. 2 which shows that the camera 10 further includes a viewfinder system which is generally designated at 31. The viewfinder system 31 comprises a beamsplitter 32 which is located between the zooming lens section 16 and the prime lens section 14. The beamsplitter 32, which may also be a small prism, serves as an entrance window to the viewfinder system 31 being centrally located to intercept the beam from the rear surface of the preceding zooming lens section 16 prior to the passage of the beam into and through the prime lens section 14 which forms the final image on the film. The beamsplitter 32 functions to deflect light through a 90° angle to the remaining essential optical components of the viewfinder system 31 which comprise from front to rear along a folded optical axis, $OA_V$, of the viewfinder system 31 a first equi-convex lens element 34, a plano mirror 36 which folds the optical path, $OA_V$, through 90°, a second equi-convex lens element 40 which is identical to the first lens element 34, and third and fourth equi-convex lens elements, 44 and 48, respectively, which form a second identical lens pair in the optical train of the viewfinder system 31. Located between the lens elements 40 and 44 is a central real stop 42 which serves as the aperture stop of the viewfinder system 31, and between the plano mirror 36 and the lens element 40 there is provided a glare stop 38 which functions at its location to limit unwanted light from entering the viewfinder system 31 to prevent loss of contrast and glare. Between the lens elements 44 and 48, there is provided a field stop 46 which functions to provide a rectangular field mask. As more fully described in U.S. Pat. No. 3,583,785, the viewfinder system 31 is structured in the foregoing manner to provide the eye with a well-defined rectangular field stop, an erect image field equal to that covered by the camera lens, unit optical power, and an accessible eye relief.

Located between the beamsplitter 32 and the forward element of the prime lens section 14 is a real stop 50 which serves as the aperture stop for the zooming optical system 12.

The present invention relates to a method and optical apparatus by which the prime lens section 14 of the camera zooming optical system 12 can be used independently of the zooming lens section 16 in a fixed focus configuration to form an image at the film plane 52 which is favorably corrected for aberrations.

Figure 3:
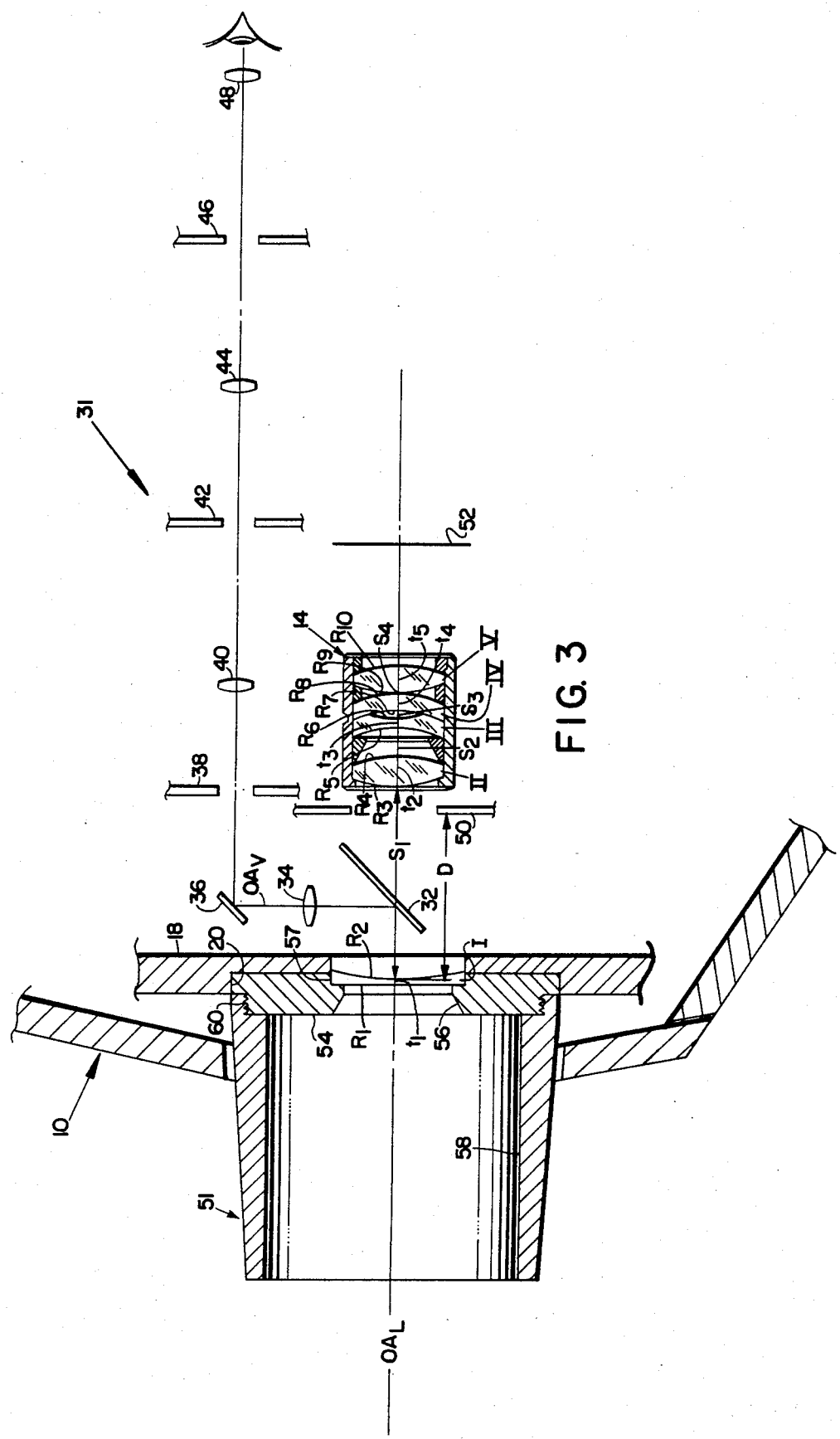
FIG. 3 is a cross-sectional view similar to FIG. 2 illustrating the present invention in place of the prior art variable focus afocal lens section of FIG. 2.

Referring now to FIG. 3, there is shown at 51 an assembly to be used instead of the zooming optical section 16 of the zooming optical system 12. The assembly 51 comprises a circular adapter plate 54 which fits into the recess 20 in which the zoom lens section 16 mounts. Centrally located in the adapter plate 54 is a circular aperture 56 which allows light from the scene to proceed toward the prime lens section 14. At the forward end of the circular adapter plate 54 there are provided threads 60 to which a flare hood 58 attaches via complementary configured threads located at its rear end.

Located at the rear side of the adapter plate 54 is a recess 57 that is structured to receive optical means in the form of an optical element generally designated at Roman numeral I. The optical element I has at least one aspheric surface thereon and is optically structured to simulate the aberration correction characteristics of the zooming lens section 16 so that the optical element I in combination with the prime lens section 14 cooperate to form on the film plane 52 a final image of the scene which is favorably corrected for aberrations.

The optical element I can be mounted in registration with the aperture 57 of the adapter plate 54 either before or after the adapter plate 54 is mounted in the camera 10. The distance from the rear of the prime lens section 14 to the film plane 52 is adjusted in a well-known manner with the optical element I in place in the camera 10 so that the focus of the prime lens section 14 in combination with the optical lens element I is properly set for a finite object distance. Afterwards the prime lens section 14 is preferably fixed in place in a well-known manner.

Two specific examples, A and B respectively, for the optical configuration of the optical element I in combination with the elements of the prime lens section 14 are given in the tables which follow with reference to FIG. 3.

EXAMPLE A

| Lens | $n_d$ | V | Radii (in.) | Thickness (in.) |
|---|---|---|---|---|
| I | 1.4917 | 57.2 | $R_1, R_2 = \infty$ | $t_1 = .070$ |
|   |   |   |   | $s_1 = 0.841$ |
| II | 1.6911 | 54.8 | $R_3 = .614$ | $t_2 = .126$ |
|   |   |   | $R_4 = -1.245$ | $s_2 = .133$ |
| III | 1.7508 | 27.8 | $R_5 = -.450$ | $t_3 = .040$ |
|   |   |   | $R_6 = .48$ | $s_3 = .023$ |
| IV | 1.6111 | 58.8 | $R_7 = -2.0187$ | $t_4 = .100$ |
|   |   |   | $R_8 = -0.5755$ | $s_4 = .005$ |
| V | 1.6111 | 58.8 | $R_9 = 0.599$ | $t_5 = .128$ |
|   |   |   | $R_{10} = -0.5564$ |   |

In the above table Roman numerals identify lens elements from front to rear; $n_d$ is the refractive index; V is the Abbe number; $R_1, R_2 \ldots$ represent radii of successive refractive surfaces from front to rear; t and s represent thickness of lens elements and air spaces, respectively; and element I has an aspheric surface superimposed on its basic radius given above which surface is given by:

$$Z = 0.170171 Y^4 + 1.47874 Y^6$$

where Z is the height of the asphere along the optical axis, $OA_L$, measured from a reference plane tangent to its vertex and perpendicular to the optical axis and Y is the radial distance of the aspheric surface from the optical axis.

EXAMPLE B

| Lens | $n_d$ | V | Radii | Thickness (in.) |
|---|---|---|---|---|
| I | 1.4917 | 57.2 | $R_1 = 10.013185$ | $t_1 = .040$ |
|   |   |   | $R_2 = \infty$ | $s_1 = 0.791$ |
| II | 1.6911 | 54.8 | $R_3 = .614$ | $t_2 = .126$ |
|   |   |   | $R_4 = -1.245$ | $s_2 = .133$ |

-continued

| Lens | $n_d$ | V | Radii (in.) | Thickness (in.) |
|---|---|---|---|---|
| III | 1.7508 | 27.8 | $R_5 = -.450$ | $t_3 = .040$ |
|  |  |  | $R_6 = .48$ | $s_3 = .023$ |
| IV | 1.6111 | 58.8 | $R_7 = -2.0187$ | $t_4 = .100$ |
|  |  |  | $R_8 = -0.5755$ | $s_4 = .005$ |
| V | 1.6111 | 58.8 | $R_9 = 0.599$ | $t_5 = .128$ |
|  |  |  | $R_{10} = -0.5564$ |  |

Similarly, in the above table, Roman numerals identify lens elements from front to rear; $n_d$ is the refractive index; V is the Abbe number; $R_1$, $R_2$ ... represent radii of successive refractive surfaces from front to rear; t and s represent thickness of lens elements and air spaces, respectively; and element I has an aspheric surface superimposed on its basic radius given above which surface is given by:

$$Z = 0.05Y^2 + 0.170171Y^4 + 1.47874Y^6,$$

where Z is the height of the asphere along the optical axis, $OA_L$, measured from a reference plane tangent to its vertex and perpendicular to the optical axis and Y is the radial distance of the aspheric surface from the optical axis.

In both of the tables given above, the five element examples given have an effective focal length of 0.663 inches, a back focal length of 0.459 inches, an f-number of 1.75, and an object semi-field angle of 11.96°. However, in Example A above, the distance, D, to the central aperture stop 50 (see FIG. 3) is 0.750 inches while in Example B, that distance is 0.791 inches.

Referring now generally to FIGS. 4–12, there are shown a series of graphs which represent the results of well-known computer generated spot diagrams for the prime lens section 14 with and without the optical element I of the invention as described in Examples A and B. Each curve is plotted from spot diagrams for theoretical object point sources on axis, at 0.4, 0.7 and full field (1.0). Each spot diagram is produced by 300 rays traced in 3 colors (100 in each color and with C, D, and F lines given equal weighting) with each ray originating at one of the point sources and landing on a reference plane coincident with the film plane 52.

Figure 5:
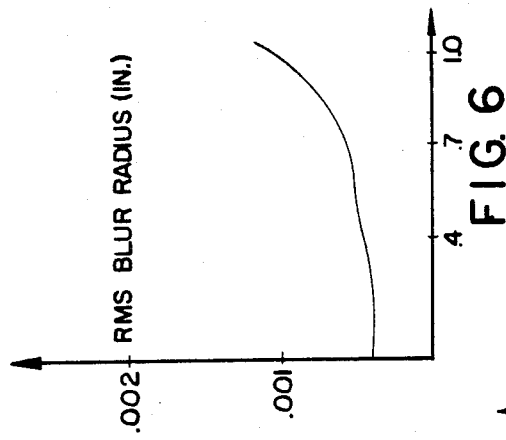
Figure 6:
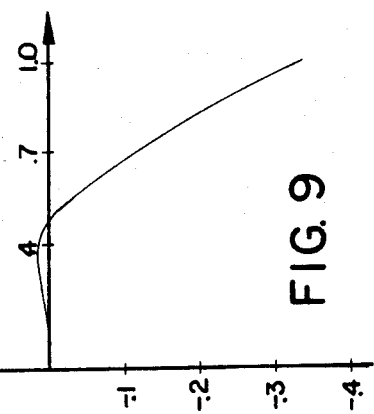
Figure 4:
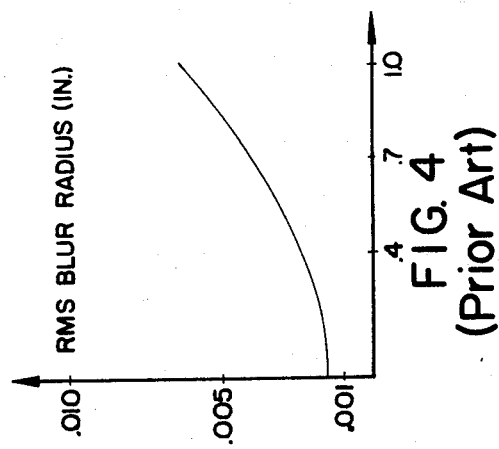

FIGS. 4, 5 and 6 show the RMS (Root Mean Square) blur of the prime lens section 14 without optical element I, with optical element I as shown in EXAMPLE A, and with optical element I as shown in Example B respectively, all at a common focus. RMS blur corresponds to the circle of confusion and represents the combined effect of all aberrations except distortion. To determine the RMS blur on a well-known manner, the centroid of the spot diagram is calculated and a vector is drawn from the centroid to each spot (the point where the ray lands in the reference plane). The root-mean-square magnitude of these vectors is then calculated to yield the RMS blur, a radius. If the reference plane is the film plane, as it is here, and the film is flat, blur will become visible at an RMS blur value of 0.0018 inches, corresponding to the conventional circle of confusion diameter of 0.005 inches. An RMS blur radius in excess of 0.005 inches usually indicates image degradation to a commercially unacceptable level. A comparison of either FIG. 5 or 6 with FIG. 4 demonstrates that the prime lens section 14 could not be used without the optical element I of Examples A and B and achieve an acceptable RMS blur radius at all field locations as is the case with Examples A and B.

Figure 8:
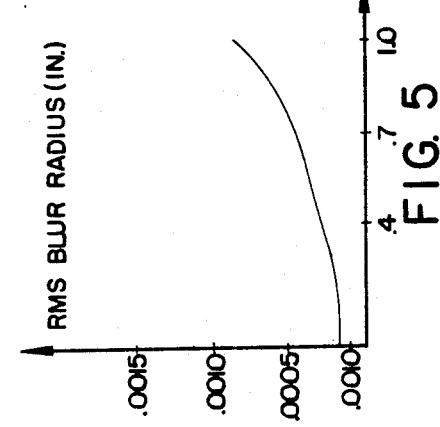
Figure 9:
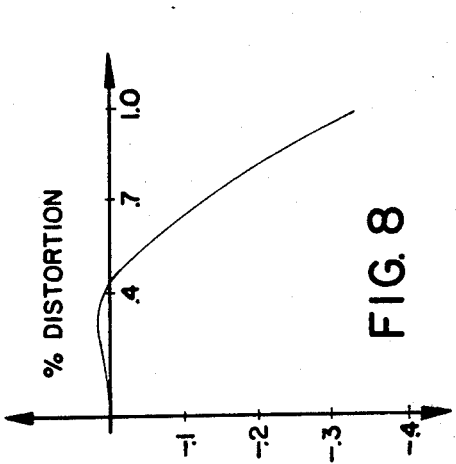
Figure 7:
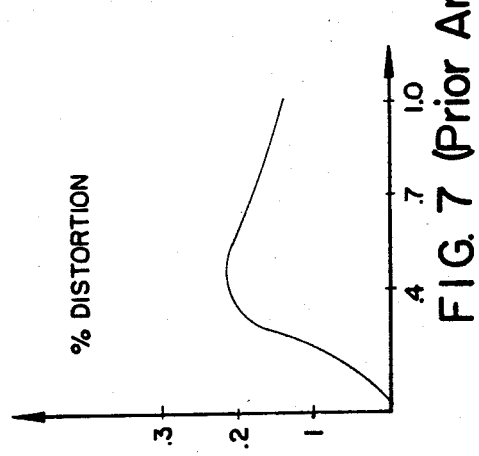

FIGS. 7, 8 and 9 demonstrate the distortion of the prime lens section 14 without optical element I, with optical element I as shown in Example A, and with optical element I as shown in Example B, respectively, at a common fixed focus. Distortion is calculated in a well-known manner from the spot diagram by measuring the displacement of the spot diagram centroid from the paraxial chief ray. The distortion percentage figure plotted as the ordinate of FIGS. 7, 8 and 9 is the ratio of this displacement to the paraxial chief ray height times 100. With the reference plane as the film plane, the distortion is actual distortion as it would appear in a developed print. Positive distortion is pin cushioned; negative distortion is barrel. In general, while distortion is preferably less than 2%, distortion up to 5% may be acceptable. A comparison of FIGS. 7, 8 and 9 demonstrates that the distortion levels are acceptable in all cases.

FIGS. 10, 11 and 12 represent the field sag of the prime lens section 14, Example A, and Example B, respectively, at the same focus position. Each graph describes the field coverage of the lens, its astigmatism and its state of focus. Sagittal points on the graphs are connected with dash and dot lines; tangential points are connected with dash lines. The combined effects of all aberrations, except distortion, from the reference plane is the RMS blur graph plotted with solid lines. The solid line is the best RMS image surface or, in other words, the locus of the circle of least confusion in the RMS sense. The vertical axes of FIGS. 10–12 are the same as the horizontal axes of FIGS. 4–6 and 7–9. The horizontal axes of FIGS. 10–12 represent axial displacement of the RMS blur away from the reference plane. A comparison of the field sags for Examples A and B demonstrate that the performance of the prime lens section 14 when used in combination with the lens element I of either Example A or B is considerably improved over the performance of the prime lens section 14 without the use of the lens element I of Examples A and B.

Certain changes may be made in the above-described embodiments without departing from the scope of the invention, and those skilled in the art may make still other changes according to the teachings of the disclosure. Therefore, it is intended that all matter contained in the above description or shown in the accompanying drawings shall be interpreted as illustrative and not in a limiting sense.

What is claimed is:

1. In combination with a fixed-focus, four-element air spaced lens having the following characteristics

| Lens | $n_d$ | V | Radii (in.) | Thickness (in.) |
|---|---|---|---|---|
| I | 1.6911 | 54.8 | $R_1 = .614$ | $t_1 = .126$ |
|  |  |  | $R_2 = -1.245$ | $s_1 = .133$ |
| II | 1.7508 | 27.8 | $R_3 = -.450$ | $t_2 = .040$ |
|  |  |  | $R_4 = .48$ | $s_2 = .023$ |
| III | 1.6111 | 58.8 | $R_5 = -2.0187$ | $t_3 = .100$ |
|  |  |  | $R_6 = -0.5755$ | $s_3 = .005$ |
| IV | 1.6111 | 58.8 | $R_7 = 0.599$ | $t_4 = .128$ |
|  |  |  | $R_8 = -0.5564$ |  | wherein Roman numerals identify lens elements from front to rear; $n_d$ is the refractive index; V is the Abbe number; $R_1$, $R_2$ ... represent radii of successive refractive surfaces from front to rear; and t and s represent thickness of lens elements and air spaces respectively, an improvement comprising:

an aspheric corrector plate spaced ahead of element I of the four element lens by a predetermined distance, having an index of refraction, $n_d$, of 1.492, and Abbe V-number of 57.2, a plano front surface, and a concave rotationally symmetric aspheric rear surface facing element I and given by:
$$Z=0.170171y^4+1.47874y^6$$

where Z is the height of the asphere along the optical axis measured from a reference plane tangent to its vertex and perpendicular to the axis and Y is the radial distance of the aspheric surface from the optical axis.

2. The improvement of claim 1 wherein said predetermined distance between said aspheric corrector plate and element I as measured along the optical axis between their respective apices is 0.841 inches.

3. The improvement of claim 2 further including a real aperture stop located between said aspheric corrector plate and element I of the four element, air spaced lens, said aperture stop being spaced behind said corrector plate by 0.750 inches.

4. In combination with a fixed-focus, four-element air spaced lens having the following characteristics

| Lens | $n_d$ | V | Radii (in.) | Thickness (in.) |
|---|---|---|---|---|
| I | 1.6911 | 54.8 | $R_1 = .614$ | $t_1 = .126$ |
|   |        |      | $R_2 = -1.245$ | $s_1 = .133$ |
| II | 1.7508 | 27.8 | $R_3 = -.450$ | $t_2 = .040$ |
|   |        |      | $R_4 = .48$ | $s_2 = .023$ |
| III | 1.6111 | 58.8 | $R_5 = -2.0187$ | $t_3 = .100$ |
|   |        |      | $R_6 = -0.5755$ | $s_3 = .005$ |
| IV | 1.6111 | 58.8 | $R_7 = 0.599$ | $t_4 = .128$ |
|   |        |      | $R_8 = -0.5564$ |  | wherein Roman numerals identify lens elements from front to rear; $n_d$ is the refractive index; V is the Abbe number; $R_1$, $R_2$ ... represent radii of successive refractive surfaces from front to rear; and t and s represent thickness of lens elements and air spaces respectively, an improvement comprising:

an aspheric corrector plate spaced ahead of element I of the four element lens by a predetermined distance, having an index of refraction, $n_d$, of 1.492, an Abbe V-number of 57.2, a front surface having a radius of 10.013185 in., and a rotationally symmetric aspheric rear surface facing element I and given by:

$$Z=0.05Y^2+0.170171Y^4+1.47874Y^6,$$

where Z is the height of the asphere along the optical axis measured from a reference plane tangent to its vertex and perpendicular to the axis and Y is the radial distance of the aspheric surface from the optical axis.

5. The improvement of claim 4 wherein said predetermined distance between said aspheric corrector plate and element I as measured along the optical axis between their respective apices is 0.791 inches.

6. The improvement of claim 5 further including a real aperture stop located between said aspheric corrector plate and element I of the four element, air spaced lens, said aperture stop being spaced behind said corrector plate by 0.700 inches.

7. A five element, air spaced optical system having the following characteristics:

| Lens | $n_d$ | V | Radii (in.) | Thickness (in.) |
|---|---|---|---|---|
| I | 1.4917 | 57.2 | $R_1, R_2 = \infty$ | $t_1 = .070$ |
|   |        |      |                     | $s_1 = 0.841$ |
| II | 1.6911 | 54.8 | $R_3 = .614$ | $t_2 = .126$ |
|   |        |      | $R_4 = -1.245$ | $s_2 = .133$ |
| III | 1.7508 | 27.8 | $R_5 = -.450$ | $t_3 = .040$ |
|   |        |      | $R_6 = .48$ | $s_3 = .023$ |
| IV | 1.6111 | 58.8 | $R_7 = -2.0187$ | $t_4 = .100$ |
|   |        |      | $R_8 = -0.5755$ | $s_4 = .005$ |
| V | 1.6111 | 58.8 | $R_9 = 0.599$ | $t_5 = .128$ |
|   |        |      | $R_{10} = -0.5564$ |  | wherein Roman numerals identify lens elements from front to rear; $n_d$ is the refractive index; V is the Abbe number; $R_1$, $R_2$ ... represent radii of successive refractive surfaces from front to rear; t and s represent thickness of lens elements and air spaces, respectively; and element I has an aspheric surface superimposed on its basic radius given above which surface is given by:

$$Z=0.170171Y^4+1.47874Y^6$$

where Z is the height of the asphere along the optical axis measured from a reference plane tangent to its vertex and perpendicular to the axis and Y is the radial distance of the aspheric surface from the optical axis.

8. A five element, air spaced optical system having the following characteristics:

| Lens | $n_d$ | V | Radii (in.) | Thickness (in.) |
|---|---|---|---|---|
| I | 1.4917 | 57.2 | $R_1 = 10.013185$ | $t_1 = .040$ |
|   |        |      | $R_2 = \infty$ | $s_1 = 0.791$ |
| II | 1.6911 | 54.8 | $R_3 = .614$ | $t_2 = .126$ |
|   |        |      | $R_4 = -1.245$ | $s_2 = .133$ |
| III | 1.7508 | 27.8 | $R_5 = -.450$ | $t_3 = .040$ |
|   |        |      | $R_6 = .48$ | $s_3 = .023$ |
| IV | 1.6111 | 58.8 | $R_7 = -2.0187$ | $t_4 = .100$ |
|   |        |      | $R_8 = -0.5755$ | $s_4 = .005$ |
| V | 1.6111 | 58.8 | $R_9 = 0.599$ | $t_5 = .128$ |
|   |        |      | $R_{10} = -0.5564$ |  | wherein Roman numerals identify lens elements from front to rear; $n_d$ is the refractive index; V is the Abbe number; $R_1$, $R_2$ ... represent radii of successive refractive surfaces from front to rear; t and s represent thickness of lens elements and air spaces, respectively; and element I has an aspheric surface superimposed on its basic radius given above which surface is given by:

$$Z=0.05Y^2+0.170171Y^4+1.47874Y^6,$$

where Z is the height of the asphere along the optical axis measured from a reference plane tangent to its vertex and perpendicular to the axis and Y is the radial distance of the aspheric surface from the optical axis.

* * * * *